US012667742B2

(12) United States Patent
Nötzel et al.

(10) Patent No.: US 12,667,742 B2
(45) Date of Patent: Jun. 30, 2026

(54) MULTI-REGION FIRE-EXTINGUISHING SYSTEM AND REGION BLOCKING DEVICE

(71) Applicant: Minimax Viking Patent Management GmbH, Bad Oldesloe (DE)

(72) Inventors: Thomas Nötzel, Lübeck (DE); Wolfgang Habitzl, Neumitterndorf (AT)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 248 days.

(21) Appl. No.: 18/037,252

(22) PCT Filed: Nov. 22, 2021

(86) PCT No.: PCT/EP2021/082417
§ 371 (c)(1),
(2) Date: May 16, 2023

(87) PCT Pub. No.: WO2022/106671
PCT Pub. Date: May 27, 2022

(65) Prior Publication Data
US 2024/0001184 A1 Jan. 4, 2024

(30) Foreign Application Priority Data
Nov. 20, 2020 (DE) ..................... 10 2020 130 809.4

(51) Int. Cl.
*A62C 35/68* (2006.01)
*A62C 3/00* (2006.01)
(Continued)

(52) U.S. Cl.
CPC .............. *A62C 35/68* (2013.01); *A62C 3/002* (2013.01); *A62C 31/05* (2013.01); *A62C 35/023* (2013.01);
(Continued)

(58) Field of Classification Search
CPC ....... A62C 35/68; A62C 35/023; A62C 35/13; A62C 35/645; A62C 3/002; A62C 1/05; A62C 37/40; A62C 99/0027
See application file for complete search history.

(56) References Cited

U.S. PATENT DOCUMENTS 2,023,569 A 12/1935 Allen et al.
2004/0055764 A1 3/2004 Bowyer et al.
(Continued)

FOREIGN PATENT DOCUMENTS

DE 29923275 U 8/2000
DE 10 2010 013805 A1 10/2011
(Continued)

OTHER PUBLICATIONS

International Searching Authority, International Search Report with English translation, International Application No. PCT/EP2021/082417, 5 pages; Mar. 9, 2022.

*Primary Examiner* — Steven M Cernoch
(74) *Attorney, Agent, or Firm* — Perkins Coie LLP

(57) ABSTRACT

The invention relates to a multi-area fire extinguishing system, having a control system, a number of fluid control lines that are configured to transmit a control pressure as a function of control commands of the control system, and a number of fluid-actuated area valves that are each in fluid communication with the control lines, wherein the area valves are configured to be actuated as a function of the received control commands. The invention proposes, in particular, a fluid-actuated area blocking apparatus which is operatively coupled to the fluid control lines and to the area valves and which is configured such that, when one or more area valves are actuated, said area blocking apparatus opens up those area valves and blocks all other area valves. The invention furthermore relates to a controller for a multi-area
(Continued)

fire extinguishing system, to an area blocking apparatus for a fire extinguishing system, and to the use of same.

17 Claims, 5 Drawing Sheets

(51) Int. Cl.

| | |
|---|---|
| ***A62C 31/05*** | (2006.01) |
| ***A62C 35/02*** | (2006.01) |
| ***A62C 35/13*** | (2006.01) |
| ***A62C 35/64*** | (2006.01) |
| ***A62C 37/40*** | (2006.01) |
| ***A62C 99/00*** | (2010.01) |

(52) U.S. Cl.
CPC ............ *A62C 35/13* (2013.01); *A62C 35/645* (2013.01); *A62C 37/40* (2013.01); *A62C 99/0027* (2013.01)

(56) References Cited

U.S. PATENT DOCUMENTS

| | | | |
|---|---|---|---|
| 2017/0014656 | A1 | 1/2017 | Smith et al. |
| 2021/0069539 | A1 | 3/2021 | Nötzel et al. |

FOREIGN PATENT DOCUMENTS

| | | | | |
|---|---|---|---|---|
| DE | 102017130587 | | 6/2019 | |
| DE | 102017130587 | A1 * | 6/2019 | ............ A62C 37/46 |
| EP | 0 574 663 | A1 | 12/1993 | |
| EP | 1702654 | | 9/2006 | |
| EP | 2 186 546 | A1 | 5/2010 | |
| EP | 2 289 600 | A1 | 3/2011 | |
| EP | 2 998 002 | A1 | 3/2016 | |
| EP | 3117875 | | 1/2017 | |
| WO | WO2019122022 | | 6/2019 | |

* cited by examiner

MULTI-REGION FIRE-EXTINGUISHING SYSTEM AND REGION BLOCKING DEVICE

PRIORITY CLAIM AND INCORPORATION BY REFERENCE

This application is a 35 U.S.C. § 371 application of International Application No. PCT/EP2021/082417, filed Nov. 22, 2021, which claims the benefit of German Application No. 10 2020 130 809.4, filed Nov. 20, 2020, each of which is incorporated by reference in its entirety.

BACKGROUND OF THE INVENTION

The invention relates to a multi-area fire extinguishing system, having a control system, a number of fluidic control lines that are configured to transmit a control pressure as a function of control commands of the control system, and a number of fluid-actuated area valves that are in fluid communication with the control lines, wherein the area valves are configured to be actuated as a function of the received control commands.

For the priority-establishing German application, the German Patent and Trade Mark Office has researched the following documents: DE 1 0201 71 30587 A1, DE 29923275 U1, U.S. Pat. No. 2,023,569 A, EP 3117875 A1.

The invention furthermore relates to a fluidic controller for a multi-area fire extinguishing system of the above type. The invention furthermore relates to an area blocking apparatus for a multi-area fire extinguishing system, and to the use thereof in a multi-area fire extinguishing system.

Multi-area fire extinguishing systems (hereinafter also referred to as fire extinguishing systems) of the above type are generally known. They are used in particular to supply extinguishing agent when required to several areas, also referred to as zones, in relatively large objects for monitoring. In practice, the areas for monitoring by fire extinguishing systems are often of different sizes, such that different quantities extinguishing agent must be provided, depending on the area, when it is necessary to combat a fire. Since it is not practical to design a dedicated fire extinguishing system for each area, a central supply of extinguishing agent is generally provided, from which extinguishing is performed as required by virtue of extinguishing agent quantities being assigned as required to individual zones. By means of a fluidic controller, for example, the area valves assigned to the respective zones are actuated by application of the control pressure and are thus opened, such that extinguishing agent can flow out into defined zones. In this context, the zones in which the area valves are actuated for extinguishing purposes are also referred to as active zones. The zones in which the area valves are intended to remain closed, because no fire has been detected there and therefore no extinguishing agent is required there, are accordingly referred to as non-active zones.

Extinguishing agent is saved by virtue of extinguishing agent flowing out in targeted fashion into the active zones. More specifically, it is not necessary for in each case one supply of extinguishing agent to be provided for all areas, but it suffices to provide a supply only for one area, wherein the quantity of extinguishing agent stored is particularly preferably based on the largest of the areas. For this, it is crucial that only ever the area valves in the active zones are actuated. Especially since pressure fluctuations can occur within the control lines owing to malfunctions and environmental influences, additional securing or blocking of said area valves is necessary for this. This is normally achieved by electrical locking by way of corresponding programming via the control system.

It is considered to be a disadvantage here that implementation by way of corresponding programming via the control system is highly complex and susceptible to errors. The complexity of the programming means that this can therefore be performed only by trained and experienced personnel. Furthermore, a functional test must be performed after every program update or every program modification of the control system.

SUMMARY OF THE INVENTION

Against this background, it was the object of the invention to propose, for a multi-area fire extinguishing system, a way of overcoming the above disadvantages to the greatest possible extent. In particular, it was the object, in the case of a fire extinguishing system of the type described above, to prevent the undesired escape of extinguishing agent from the area valves in a reliable and in particular fail-safe manner, and at the same time to reduce the effort involved in installing and maintaining the fire extinguishing system.

The invention achieves the object on which it is based by specifying a multi-area fire extinguishing system that proposes a fluid-actuated area blocking apparatus which is operatively coupled to the fluid control lines and to the area valves and which is configured such that, when one or more area valves are actuated, said area blocking apparatus opens up those area valves and blocks all other area valves.

Preferably, the fluid control lines are operatively coupled to a fluidic controller which is in signal communication with the control system such as to receive control commands for combating a fire, wherein the controller is configured to actuate one or more of the area valves as a function of the received control commands, using the control pressure.

The fire extinguishing system has a pressurized fluid source which the fluid control lines are in fluid communication with the pressurized fluid source. The fluid source may have one or more pressurized, fluid-filled tanks or bottles.

The control lines extend, in principle, from the fluid source to the area valves. The blocking apparatus is preferably interposed therein and has internal flow paths via which it transmits the control pressure from an inlet-side part of the control lines to a respective outlet-side part of the control lines. Along these flow paths, the blocking apparatus has shut-off elements which, in accordance with their actuation, shut off or open up said flow paths, as will be discussed in yet more detail in the preferred embodiments described below.

The fluidic controller is preferably configured as a control unit which has a number of line inlets and line outlets corresponding to the number of control lines, and a number of control elements for signal transmission. Alternatively, the fluidic controller is preferably configured as an arrangement of separate control elements, which themselves are operatively coupled to the control lines and in signal communication with the control system.

The fluidic controller is preferably arranged upstream of the blocking apparatus, or the blocking apparatus is preferably arranged between the fluidic controller and the area valves.

An area valve in the actuated, active state is to be understood in the present case to mean an opened area valve through which extinguishing agent can flow. By contrast, in the non-actuated state, the area valve is closed, such that no extinguishing agent can flow out.

Fluidic actuation is to be understood in the present case to mean actuation using energy transmitted by the flow of gases or liquids, in particular hydraulic or pneumatic actuation.

According to the invention, control systems are to be understood to include fire alarm control panels, extinguishing control panels, fault warning stations, hazard alert systems, building services management systems, switching equipment and combinations of these. The control systems that may be used in conjunction with the invention may be configured as hardware-based and/or software-based functional units and be provided in centralized or decentralized form as a function of the installation requirements at the respective object.

The invention provides, for the first time, automatic blocking of the area valves of non-active zones of multi-area extinguishing systems when a control pressure is present to open area valves of active zones or areas. The area blocking apparatus according to the invention can reduce, and in the best case eliminate, the complexity and error susceptibility of the programming of the control system.

A further advantage is that existing control systems can continue to be used even if they do not provide a dedicated facility for programming the securing or blocking of the (non-active) area valves.

In an advantageous further development of the invention, the area blocking apparatus has a number of internal flow paths by means of which the control lines and the area valves are connectable in fluid-conducting fashion. The blocking apparatus is preferably actuatable by way of the control pressure to block and/or open up the flow paths. The area blocking apparatus thus not only blocks the flow paths as a function of an external signal but is itself also actuated by such a fluidic signal, in particular by the control pressure itself. Direct coupling of the actuation of the area blocking apparatus and the actuation of the area valves is thus possible, and there is no need for additional signal-based blocking of the electrical actuation of further areas.

The area blocking apparatus preferably has a number of fluid inlets and a number of fluid outlets in fluid communication with the fluid inlets, wherein the fluid inlets are operatively coupled to the fluidic controller and the fluid outlets are connected to a respective one of the area valves, and the area blocking apparatus is configured such that, whenever control pressure prevails at a fluid inlet, said area blocking apparatus transmits the control pressure from the respective fluid inlet to the fluid outlet and at the same time separates all other fluid exits from the fluid inlets in fluid-tight fashion.

The respective flow paths can thus be mechanically blocked by virtue of the respective fluid inlet being fluid-tightly separated from the corresponding fluid outlet of the area blocking apparatus. The separation of fluid inlet and fluid outlet causes the respective flow path to be reliably blocked, such that the area valve to which the flow path is assigned cannot be actuated. In the context of the invention, an operative connection, such as that between the fluid inlet and the fluid outlet, is to be understood to mean a direct or indirect connection by which the fluid inlet and the fluid outlet are connected such that, for example, a pressure acting at the fluid inlet can be transmitted through the connection to the fluid outlet.

By virtue of the fact that, whenever control pressure prevails at one fluid inlet, all other fluid outlets are separated in fluid-tight fashion from the fluid inlets, a constrained relationship is established by which it is ensured that only ever the flow path of the actuated area valve is opened up, and all other flow paths are forcibly blocked.

The area blocking apparatus preferably has, for each area valve, a respective shut-off element that can be moved into a shut-off position in order to block the flow path, wherein the shut-off elements are operatively coupled such that those flow paths which are respectively assigned to an actuated area valve are opened up by the respective shut-off element, and at the same time all other shut-off elements assume the shut-off position to block the other flow paths. In this context, the operative connection of the shut-off elements to one another has the effect that at least an indirect connection is created, in the manner of a constrained relationship, between the shut-off element in the flow path of the area valve for actuation and all other shut-off elements, which indirect connection ensures that only the flow path of the area valve for actuation is opened up by the respective shut-off element, and at the same time all other shut-off elements are forced to assume the shut-off position owing to the operative connection. There is thus a mechanical connection, such that error-susceptible electronic transmission paths of the shut-off elements to one another, or between the controller and the shut-off elements, are avoided.

In the context of the invention, the opening-up of a flow path is also to be understood to mean maintaining the opened-up state of a flow path that has already been opened up in the non-actuated state of all area valves.

In a further preferred embodiment, the shut-off elements are actuated by differential pressure control and each have a first active surface and a second, spaced-apart active surface, wherein the shut-off elements move into the shut-off position when a greater pressure acts on the second active surface than on the first active surface. The provision of active surfaces results in a defined, easily calculable force that is proportional to the pressure acting on the shut-off elements. The acting force can be scaled through corresponding dimensioning of the active surfaces.

The active surfaces are spaced apart and are preferably arranged parallel to one another. It likewise falls within the invention for the active surfaces to assume an angle of inclination relative to one another, wherein the first active surfaces lie in a plane that has at least one component parallel to the plane of the second active surfaces. In detail, the active surfaces may be oriented at an angle of $-90°<\alpha<90°$ with respect to one another. In particular, the active surfaces are oriented relative to one another such that, when a pressure acts on the active surfaces, the resultant force has at least one component in the direction of, or in the direction opposite to, the shut-off position.

Preferably, control pressure acts on both the first active surface and the second active surface if control pressure prevails at the respective fluid inlet to actuate the area valve, wherein the second active surfaces are in fluid communication with one another such that control pressure simultaneously acts on all other second active surfaces, such that that flow path is opened up by the respective shut-off element which is assigned to the actuated area valve, and at the same time all other shut-off elements assume the shut-off position to block the other flow paths.

It is furthermore preferred that ambient pressure acts on the first active surface and the second active surface if control pressure to actuate one of the area valves is absent from the respective fluid inlet. The respective flow path is thus opened up for long enough to allow a control pressure for actuating another area valve, which is not assigned to the flow path, to prevail at the corresponding fluid inlet in the flow path of the respective actuated area valve.

If an area valve is actuated, the corresponding shut-off element does not need to firstly be moved into a release position. In this way, the response times are shortened and it can be ensured that, in the event of a fire, the area valves can be reliably actuated, and no shut-off elements remain in the flow path owing to malfunctions.

In a further preferred embodiment, the flow path upstream of the shut-off element has in each case one branch channel, wherein the second active surfaces are in fluid communication by means of the branch channels. A fluid-conducting connection of the second active surfaces can be easily provided by way of such branch channels. If control pressure prevails in one of the flow paths or at the fluid inlet of the area blocking apparatus, this control pressure also propagates upstream of the shut-off element in the respective branch channel. By virtue of the fact that the branch channels are in fluid communication with one another, said control pressure propagates in all branch channels of the area blocking apparatus and consequently acts on all second active surfaces of the shut-off elements. Only in the flow channels that are assigned to actuated area valves does a pressure above ambient pressure, preferably the control pressure, also act on the first active surfaces, such that there no pressure difference arises and the flow channel remains opened up. In the other flow paths, in which a pressure difference arises as described, the ambient pressure that acts on the second active surfaces gives rise to a force in the direction of the shut-off position, such that the shut-off elements are moved into the shut-off position and separate the respective fluid inlet in fluid-tight fashion from the corresponding fluid outlet and thus block the respective flow path.

Preferably, in each of the branch channels, there is arranged a non-return valve that is configured to prevent a flow from the branch channel in the direction of the fluid inlet. Non-return valves are configured to allow a flow through the valve in a first direction and prevent such a flow in a second, opposite direction. A flow from the branch channel in the direction of the respective fluid inlet is thus prevented by the non-return valve. This flow in the direction of the respective fluid inlet would lead to a depletion of the control pressure, such that the force acting on the second active surfaces would be reduced, and the shut-off element possibly would not reach the shut-off position.

The area blocking apparatus furthermore preferably has a number of non-return elements that are configured to each subject the first active surface to a restoring force acting counter to the shut-off direction, such that the shut-off element must overcome the restoring force to move into the shut-off position. It is thus ensured that the shut-off elements open up the flow channel for long enough to allow a force exceeding the respective restoring force to act on the second active surfaces of the shut-off element. Thus, during an actuation of the respective area valves, a short response time can be ensured, and undesired blocking of the flow path can be prevented in an effective manner.

In a further preferred embodiment, the area blocking apparatus has multiple interconnectable blocking modules, and an area valve is assigned to each blocking module, wherein each of the blocking modules has a fluid inlet, a fluid outlet and, arranged between fluid inlet and fluid outlet, a shut-off element for selectively blocking the flow path assigned to the respective area valve. Owing to a modular construction, the area blocking apparatus can thus be individually adapted to the fire extinguishing system and in particular to the number of area valves. If the fire extinguishing system is expanded, for example, the corresponding area blocking apparatus can be expanded by adding further interconnectable blocking modules. Here, each individual blocking module has a fluid inlet, a fluid outlet and a shut-off element arranged between fluid inlet and fluid outlet. Thus, each individual blocking module is configured to selectively block the respective flow path of the area valve. Here, the blocking modules are interconnectable such that a fluid-conducting connection preferably exists between the second active surfaces or the branch channels.

Preferably, the fire extinguishing system furthermore has fluid-actuated alarm means, wherein the area blocking apparatus has, for each flow path, an alarm channel for fluid communication between the fluidic controller and the alarm means. Thus, for each flow channel, an alarm channel is provided in which control pressure preferably prevails to actuate the alarm means, such that the alarm means is actuated together with the area valve.

In a further preferred embodiment, the fire extinguishing system furthermore has:

- one or more fire parameter detectors that are arranged in a respective area of an object for monitoring,
- a control system that is in signal communication with the fire parameter detectors,
- preferably one or more manual triggering devices, which are arranged in a respective area of the object for monitoring,
- a number of extinguishing agent vessels,
- a pipeline network, connected to the number of extinguishing agent vessels, for transporting the extinguishing agent, wherein the pipeline network comprises the number of area valves,
- a control pressure source, in particular a pressurized gas vessel, which is connected to the fluidic controller.

According to the invention, where a pressurized gas vessel is referred to, this preferably means a pressurized gas vessel filled with carbon dioxide, compressed air, argon, nitrogen or a mixture of these gases.

The invention has been described above in a first aspect relating to a multi-area fire extinguishing system. In a second aspect, the invention relates to a fluidic controller for a multi-area fire extinguishing system of the type described above, having

- a first interface for signal communication with a control system in order to receive, from the control system, control commands for combating a fire, and
- a second, fluidic, interface for fluid communication with a number of fluid control lines that transmit a control pressure, and
- a third, fluidic interface for outputting the control pressure to actuate a number of fluid-actuated area valves, wherein the fluidic controller is configured to, as a function of the control commands received from the control system via the first interface, transmit the control pressure received via the second interface to the third interface to actuate one or more of the area valves.

In a second aspect, the invention achieves the underlying object in that the fluidic controller has a fluid-actuated area blocking apparatus which is operatively coupled at one side to the third fluidic interface and at the other side to the area valves and which is configured such that, when one or more area valves are actuated by means of the third interface, said area blocking apparatus opens up those area valves and blocks all other area valves.

The embodiments and advantages according to the invention according to the first aspect of the invention are at the same time preferred embodiments and advantages according to the second aspect of the invention. The advantages described with regard to the first aspect are also inherent in the fluidic controller for the multi-area fire extinguishing system of the type described above.

The invention has been described above in a first aspect relating to a multi-area fire extinguishing system and in a second aspect relating to a fluidic controller for same. In a third aspect, the invention relates to an area blocking apparatus for a multi-area fire extinguishing system, in particular for a fire extinguishing system of the type described above.

In the third aspect, the invention achieves the underlying object by means of an area blocking apparatus, having

- a first, fluidic, interface for fluid communication with a number of fluid-conducting control lines which each transmit a control pressure to actuate a number of area valves, and
- a second, fluidic, interface for fluid communication with the number of fluid-actuated area valves, wherein the area blocking apparatus has a number of internal flow paths which extend from the first to the second interface and by means of which the control lines and the area valves are in fluid communication, and said area blocking apparatus is configured to block and/or open up the flow paths by way of the control pressure such that, when one or more area valves are actuated, those area valves are opened up and all other area valves are blocked.

The above-described embodiments and advantages according to the first and second aspects of the invention are at the same time preferred embodiments and advantages according to the third aspect of the invention, and vice versa. The advantages described with regard to the first and second aspects are also inherent in the area blocking apparatus.

The first interface of the blocking apparatus is preferably configured to operatively couple, by way of a corresponding interface of a fluidic controller, to the control lines, wherein the controller is in signal communication with a control system in order to receive, from the control system, control commands for combating a fire, as has been discussed further above with regard to the preceding aspects.

In a fourth aspect, the invention achieves the underlying object with the use of an area blocking apparatus in a multi-area fire extinguishing system, in particular a fire extinguishing system according to the first aspect of the invention, wherein the area blocking apparatus comprises:

- a first fluidic interface for fluid communication with a number of fluid control lines of the fire extinguishing system, and
- a second fluidic interface for fluid communication with a number of fluid-actuated area valves of the fire extinguishing system, wherein the area blocking apparatus is operatively coupled to the fluid control lines and to the area valves and is configured such that, when one or more area valves are actuated, said area blocking apparatus opens up those area valves and blocks all other area valves.

The preferred embodiments and advantages according to the above-described aspects of the invention are at the same time preferred embodiments and advantages of the use, and vice versa. The advantages described with regard to the first, second and third aspects are also inherent in the use of the area blocking apparatus.

BRIEF DESCRIPTION OF THE DRAWINGS

The invention will be described in more detail below with reference to the appended figures and on the basis of a preferred exemplary embodiment. In the figures.

DETAILED DESCRIPTION OF THE INVENTION

Figure 1:
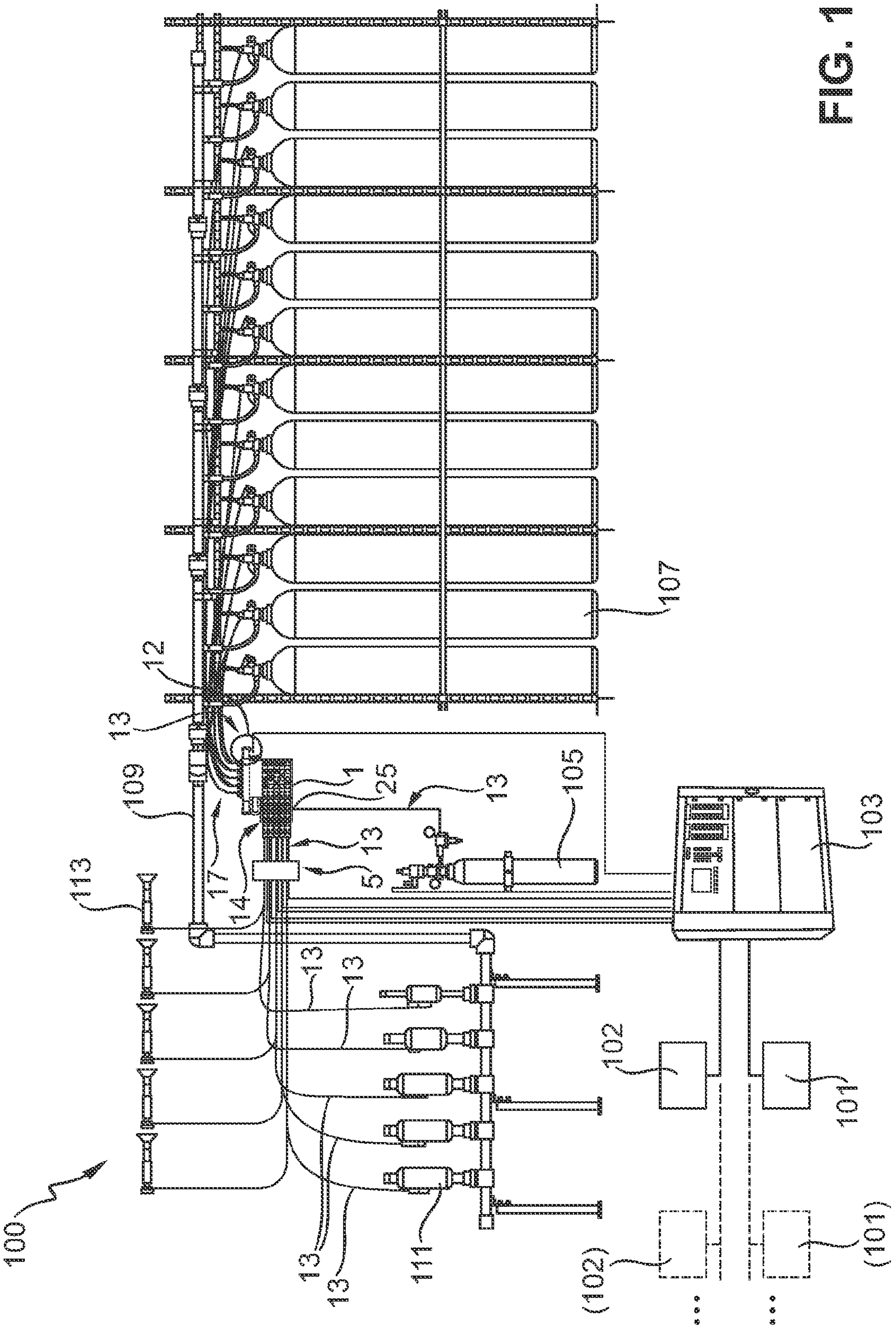
FIG. 1: is a schematic illustration of a multi-area fire extinguishing system according to the invention.

FIG. 1 shows a fire extinguishing system 100 that is configured as a multi-area fire extinguishing system. The fire extinguishing system 100 has a control system 103, for example a fire alarm control panel and/or extinguishing control panel, a fluidic controller 1, and a number of fluid-actuated area valves 111.

The controller 1 is connected in signal-conducting fashion via a (first) signal interface 12 to the control system 103 in order to receive control commands for combating a fire. The signal interface 12 may be wireless or wired. The fire extinguishing system 100 preferably has at least one fire parameter detector 101, preferably at least one fire parameter detector 101 per extinguishing area. The fire extinguishing system 100 furthermore has at least one manual triggering device 102, particularly preferably at least one manual triggering device 102 per extinguishing area, connected in signal-conducting fashion to the control system 103, and also has a control pressure source 105. A number of control lines 13, in the present example multiple control lines 13, extend from the control pressure source 105 to the area valves 111. The fluidic controller 1 is coupled into the control lines 13. Said fluidic controller is in fluid communication with the control pressure source 105 via a (second) fluidic interface 10 in the form of an entrance 25. The controller 1 furthermore has a (third) interface 14 for transmitting the control pressure in the direction of the area valves 111. Although not illustrated in the figure, multiple fire parameter detectors 101 may also be structurally combined to form a multi-sensor unit.

The blocking apparatus 5 is in fluid communication with control lines 13 in each case by means of a number of fluid inlets 19 of a (first) interface 16. The control lines 13 are connected to a fluidic controller 1. At an outlet side, the blocking apparatus 5 has a (second) interface 18 at which the control lines receive the control pressure again and transmit same to the area valves 111. An area valve 111 is assigned to in each case one area, which is to be monitored by the multi-area fire extinguishing system 100, of an object or building, and is actuated by means of the blocking apparatus 5.

At a (fourth) fluidic interface 20, the fluidic controller 1 is connected by way of fluidic exits 17 to a battery of extinguishing agent vessels 107, or to fluid-actuated valves at the extinguishing agent vessels 107. The extinguishing agent vessels 107 are furthermore fluidically connected by way of a pipeline network 109 to the area valves 111.

The fire extinguishing system 100 furthermore preferably has a number of alarm means 113, which are likewise actuated by the fluidic controller 1 by way of control pressure and are assigned to in each case one of the area valves 111. Alternatively or in addition, alarm means actuated electrically by means of the control system 103 may also be provided.

If a fire in one of the areas associated with the area valves 111 is detected by the fire parameter detector 101, or if the manual triggering device 102 is activated, these transmit a signal to the control system 103, which in turn evaluates the signal from the fire parameter detector 101 or from the manual triggering device 102. After this evaluation has been performed, control commands for combating a fire are provided by the control system 103 to the fluidic controller 1. The fluidic controller 1 fluidically actuates or controls a predefined number of extinguishing agent vessels 107, in particular by way of a control pressure, whereupon these extinguishing agent vessels 107 open and release extinguishing agent via the pipeline network 109. Additionally, as a function of the received control commands, the fluidic controller 1 fluidically actuates one or more of the area valves 111, in particular by way of a control pressure, in order to conduct the extinguishing agent that flows into the pipeline network 109 into the corresponding area. Preferably, the alarm means 113, for example klaxon(s), associated with the area valves 111 is or are then triggered and preferably likewise supplied with control pressure from the control pressure source 105 via a second flow path (cf. FIG. 4).

FIG. 1 illustrates one fire parameter detector 101, and another is indicated. Also, one manual triggering device 102 is illustrated, and another is indicated. The number and arrangement of fire parameter detectors and/or triggering devices will be correspondingly selected by a person skilled in the art as a function of the regulations that apply at the installation site. It is thus also possible, depending on the object, for more than two fire parameter detectors 101 and/or triggering devices 102 to be used. It is preferable for one or more fire parameter detectors 101 and/or triggering devices 102 to be arranged in each of the areas of the multi-area fire extinguishing system 100 and in signal communication with the control system 103.

Figure 2:
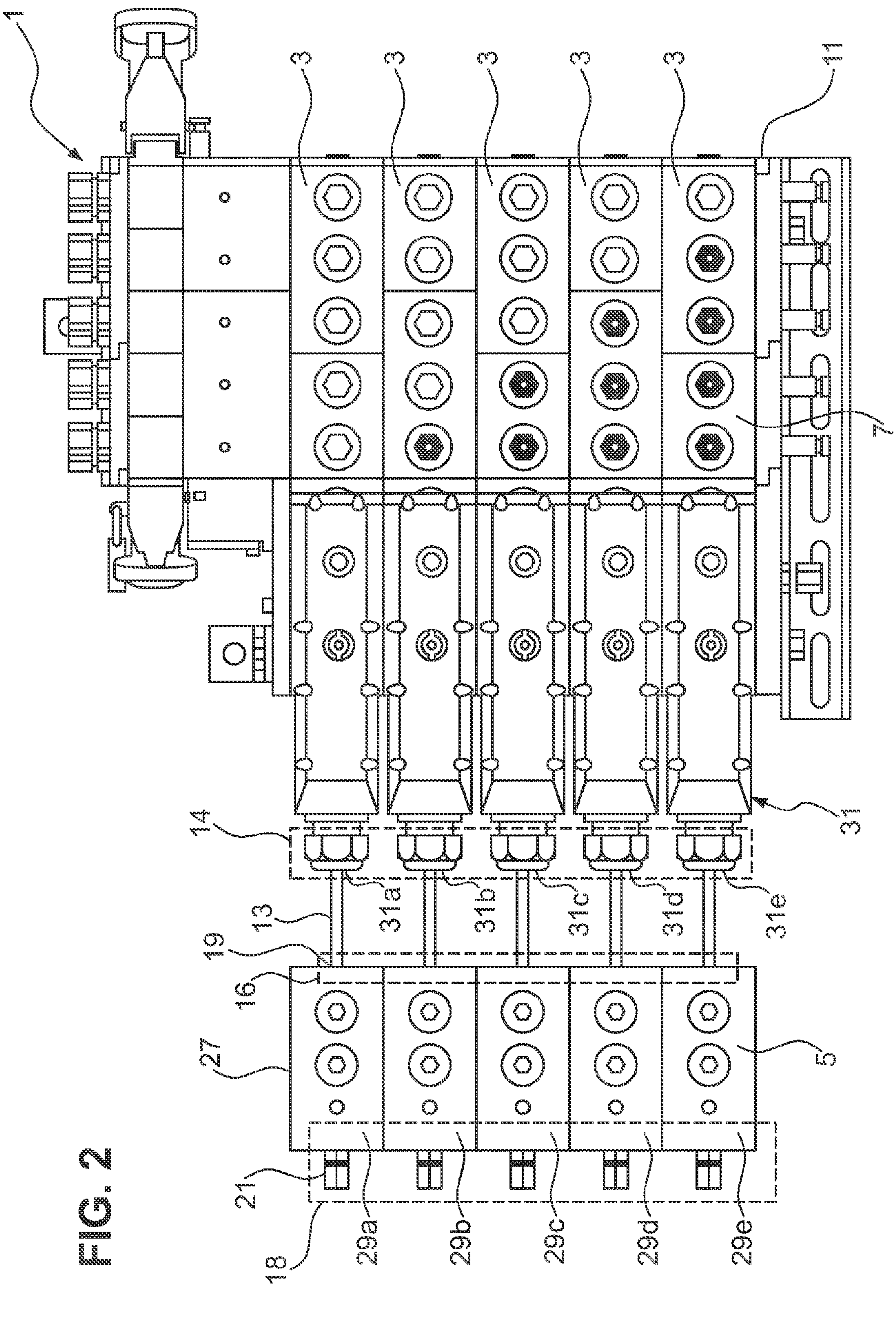
FIG. 2: is a schematic illustration of a detail of the multi-area fire extinguishing system according to FIG. 1, FIG. 3: is a schematic flow diagram of the multi-area fire extinguishing system according to the invention according to FIG. 1, FIG. 4: is a perspective illustration of an area blocking apparatus for a multi-area fire extinguishing system according to FIG. 1, FIG. 5: shows a blocking module of an area blocking apparatus according to FIG. 4.

In the preferred exemplary embodiment shown in FIG. 2, the fluidic controller 1 has a number of control units 3. The individual control units 3 are interconnectable to form a main control element 11.

The fluid inlets 19, of which a number n is provided, are operatively coupled by way of fluidic connections 31 to the respective control units 3.

The fire extinguishing system 100 furthermore has an area blocking apparatus 5. The area blocking apparatus 5 is fluidically connected, preferably coupled, to the control lines 13. The area blocking apparatus 5 has a fluid inlet 19 and a fluid outlet 21 for each of the area valves 111 (cf. FIG. 1), and a number of internal flow paths that each extend from a fluid inlet 19 to a fluid outlet 21. The flow paths will be described in detail below by way of an example.

The area blocking apparatus 5 may be configured as a stand-alone unit or as a functional module of the fluid controller 1, if the latter is also designed as a consolidated control unit.

The area blocking apparatus 5 furthermore has a main element 27 that is formed from multiple interconnectable blocking modules 29*a*, 29*b*, 29*c*, 29*d*, 29*e*. By way of example, five area blocking modules 29*a*-29*e* are provided in the exemplary embodiment in FIG. 2, but the number may be adapted according to the respective object-specific requirements.

In each case one fluid inlet 19 and one fluid outlet 21 is formed in each of the blocking modules 29*a*, 29*b*, 29*c*, 29*d*, 29*e*. Each of the modules 29*a*, 29*b*, 29*c*, 29*d*, 29*e* is couplable by means of a corresponding fluid-conducting connection 31*a*, 31*b*, 31*c*, 31*d*, 31*e* of a fluidic connecting assembly 31, wherein the fluid inlets 19 of the fluid controller 1 are connected by means of said fluidic connecting assembly 31 to the area blocking apparatus 5.

Figure 3:
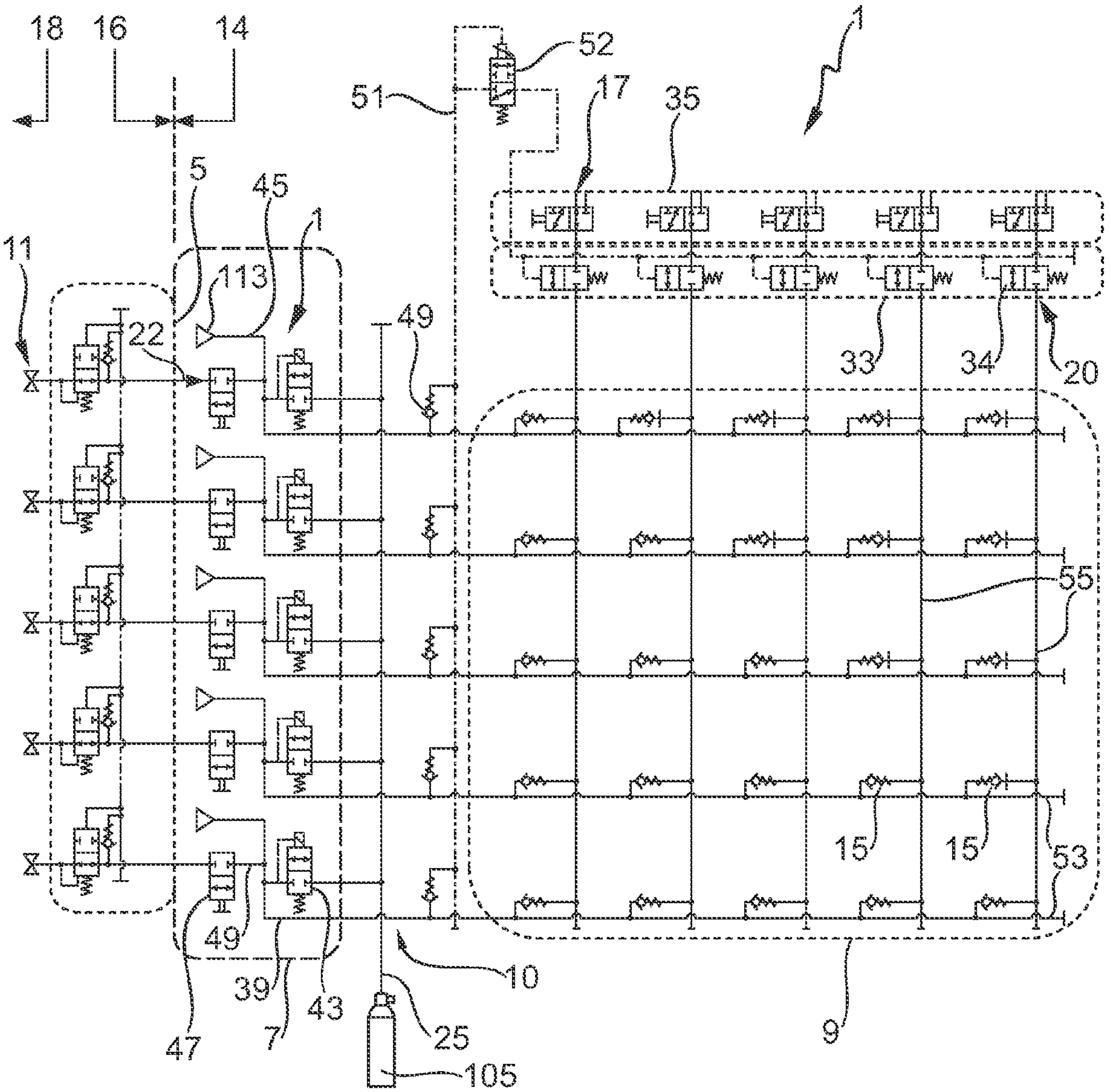

Whilst FIG. 2 shows the structural design of a variant of the fluidic controller 1 that is configured as a control unit, FIG. 3 shows a schematic flow diagram of a preferred fire extinguishing system 100.

As shown in the exemplary embodiment in FIG. 3, the fluidic controller 1 has a number of functional modules. Here, the fluidic controller 1 has a control valve module 7 as a first functional module and furthermore has a second functional module in the form of a flow control module 9. The flow control module 9 has multiple first distributor blocks and second distributor blocks (not shown), wherein the distributor blocks each have multiple shut-off elements 15. The distributor blocks within the flow control module 9 are preferably positioned with fluid-conducting capability with respect to one another by means of fluid-conducting connecting pieces. In the flow control module 9, the shut-off elements 15 are used selectively in a shut-off position or a release position in the valve blocks. In a release position, a fluidic connection is established via the third interface 14, by way of fluidic exits 22, to the associated area valves 111, whereas such a fluid passage is eliminated in the shut-off position. The matrix of exits 17 and 22 and thus of the corresponding shut-off elements 15 in the distributor blocks makes it possible to implement any desired assignment between the fluidic exits 22 of the third interface 14 and the respective area valves 111, in order to ensure that extinguishing agent is applied as required. Each of the fluidic exits 22 connected to one of the extinguishing agent vessels 107 (cf. FIG. 1) can be assigned to one or more area valves 111, and vice versa.

The functional modules 7, 9 are preferably reversibly detachably coupled, and fastened to the main control element 11, in fluid-tight fashion with respect to the surroundings by way of plug connectors.

As a further functional module, the fluidic controller 1 has a use/reserve switching module 35 which, in the switching position shown, has been switched such that the extinguishing agent vessels 107 are connected via the fluidic exits 17 of the fourth interface 20 to the fluidic controller 1. By switching over, it would be possible to connect a reserve for the extinguishing agent vessels 107 in fluid-conducting fashion to the fluidic exits 17.

As a further functional module, the fluidic controller 1 has an extinguishing agent release module 33 at the fourth interface 20. The extinguishing agent release module 33 has, for each of the fluidic exits 17, a release valve 34 that is actuated by the control pressure from the control pressure source 105, preferably after a delay owing to a delay valve 52.

At the side of the fluidic exits 22 at the third interface 14, FIG. 3 also illustrates the internal configuration of the control valve module 7. The control valve module 7 has a first flow path 39, which is configured to transmit a pressurized fluid, in particular gas, in the direction of the flow control valve 9 and in the direction of the fluidic exits 22.

The control valve module 7 furthermore has multiple second flow paths 41 that are formed between a second fluidic entrance 25 and the fluid inlets 19 (cf. FIG. 2) of the area blocking apparatus 5, wherein, in each of the second flow paths 41, there are arranged a control valve 43 and an associated shut-off element 47 which are intended, in a release position, to allow fluid transport between the fluidic entrance 25 and the area blocking apparatus 5 and, in a shut-off position, to prevent such fluid transport.

The alarm means 113 are preferably connected by way of in each case one second fluidic exit 45 to the control unit 1.

The first control valve module 7 has a fourth flow path 51 that is in fluid communication with, by way of multiple non-return valves 49, to the first flow paths 39 downstream of the control valves 43. An undesired backflow is prevented by the non-return valves 49. Control pressure is transported via the fourth flow path 51 to the extinguishing agent release module 33.

Multiple flow channel columns, one for each fluidic exit 17, extend in the form of flow channels 55 through the flow control module 9 from the extinguishing agent release module 33. The flow channels 55 arranged in columns open into the shut-off elements 15, from where they are connectable in fluid-conducting fashion to flow channels 53 arranged in rows, depending on whether the respective shut-off element 15 is arranged in a shut-off position or in a release position.

The number of exits 17 in the flow control module 9 can be flexibly adapted to the number of extinguishing agent vessels 107 to be provided, whilst the number of exits 22 in the flow control module 9 can be adapted as desired to the number of area valves 111 for actuation.

Figure 4:
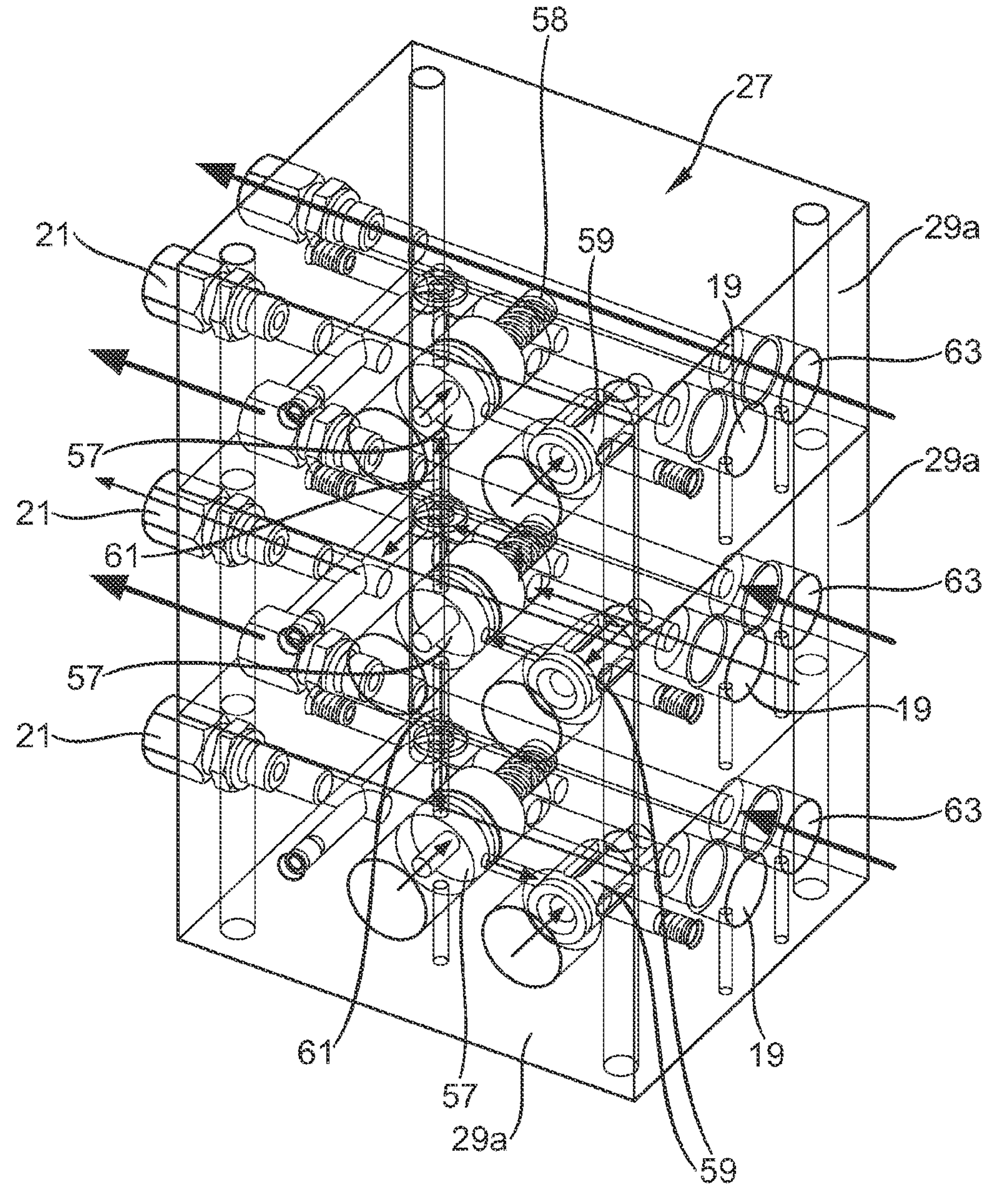

The area blocking apparatus 5 shown in more detail in FIG. 4 is arranged between the fluidic controller 1 and the area valves 111 and constitutes an additional safeguard for ensuring that opening does not unintentionally occur owing to pressure fluctuations within the fluidic controller 1. Extinguishing agent would then flow out of the pipeline network 109 through these unintentionally opened area valves 111 and be applied to areas in which there is no fire to be extinguished.

The area blocking apparatus 5 comprises the blocking modules 29*a*, 29*b*, 29*c*. According to the invention, the area blocking apparatus 5 may be composed either of a single piece or of any desired number of blocking modules 29.

In the present exemplary embodiment, each of the blocking modules 29*a*, 29*b*, 29*c* has one fluid inlet 19 and one fluid outlet 21, which can be separated in fluid-tight fashion in order to shut off the flow path from the fluidic controller 1 to the area valves 111. For this purpose, the area blocking apparatus 5 (cf. FIG. 3) has a shut-off element 57 in the respective flow path for each area valve 111. The shut-off elements 57 are movable into a shut-off position, in which they separate the fluid inlet 19 from the fluid outlet 21 in fluid-tight fashion.

Figure 5:
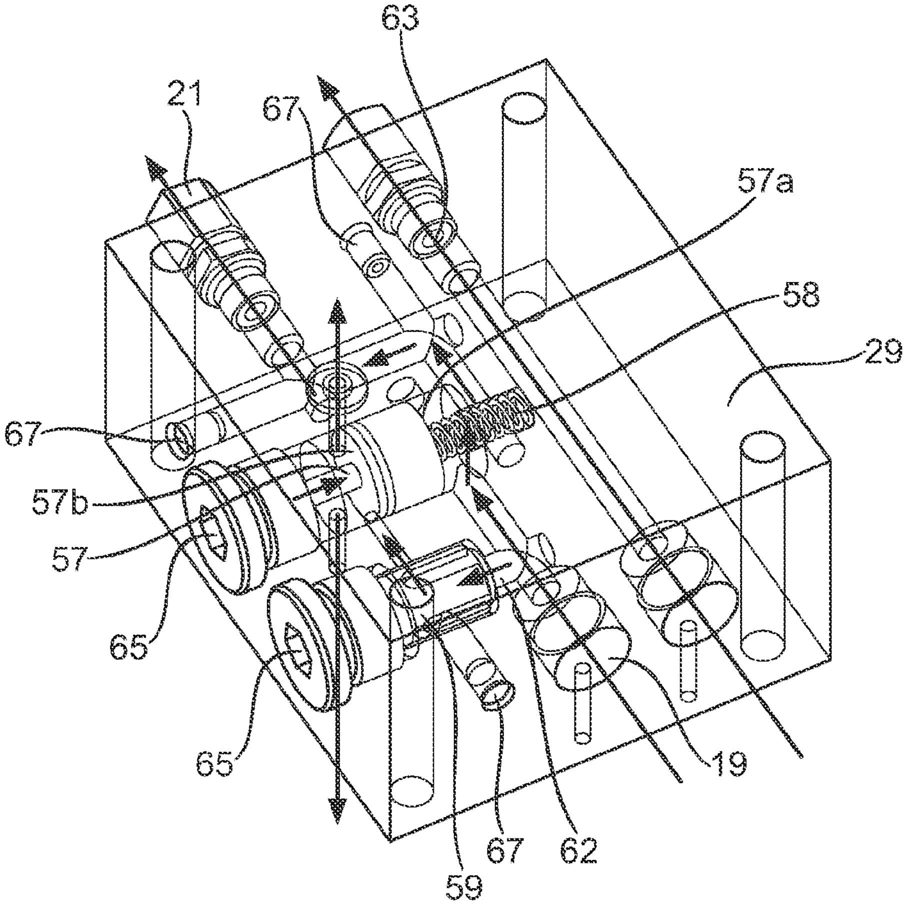

FIG. 5 is a detailed illustration of a single block module 29 of the area blocking apparatus as per FIG. 4.

As is in particular also shown in FIG. 5, each of the shut-off elements 57 has a first active surface 57*a* and a second active surface 57*b*. A restoring force is exerted on the first active surface by a restoring element 58, which is intended to prevent the shut-off element 57 from unintentionally moving into the shut-off position and blocking the flow path.

As shown in FIG. 4, the second active surfaces 57*b* of the shut-off elements 57 are fluidically coupled to one another by substantially vertically running branch channels 61. The branch channels 61 run upstream of the respective shut-off element 57 and are connected to the branch channels 62, which preferably run horizontally.

In each of the blocking modules 29*a*, 29*b*, 29*c*, 29*d*, 29*e*, there is arranged a non-return valve 59 which is arranged in each case in the horizontal branch channel 62 of the blocking module 29*b*, outside the flow path between the fluid inlet 19 and the fluid outlet 21.

The fluid flowing into the fluid inlet 19 of the blocking module 29*b* is split up in the blocking module 29*b* such that a proportion of the inflowing fluid flows through the horizontal branch channel 62 in which the non-return valve 59 is arranged. The fluid flows through the branch channel 62 and the non-return valve 59 to the second active surface 57*b* of the shut-off element 57, and onward from there through the vertical branch channels 61 to the second active surfaces 57*b* of the other shut-off elements 57 in the area blocking apparatus 5. Here, the non-return valve 59 prevents a flow from the branch channel 62 in the direction of the fluid inlet 19. The remaining fluid flows onward through the flow path in the direction of the fluid outlet 21 in the blocking module 29*b*, past the first active surface 57*a*.

The fluid flowing past causes a pressure force to act on the second active surfaces 57*a* of each of the shut-off elements 57 in the direction of the shut-off position. An opposing force acts only on the first active surface 57*a* of the shut-off element 57 in the blocking module 29*b*. Only at the fluid inlet 19 of the corresponding blocking module 29*b* does a control pressure prevail in order to actuate the associated area valve 111. This control pressure at the fluid inlet 19 in turn causes at least a proportion of the fluid to flow through the flow path in the direction of the fluid outlet 21 and past the first active surface 57*a* of the corresponding shut-off element 57. The forces on the first active surface and on the second active surface are of equal magnitude and oppositely directed, because control pressure prevails on both sides, and the active surfaces 57*a*, 57*b* each have the same cross-sectional area. The forces acting on the active surfaces 57*a* and 57*b* in the blocking module 29*b* are thus equal, such that only the shut-off element 57 in the blocking module 29*b* remains in a position in which the fluid inlet 19 and the fluid outlet 21 are in fluid communication. The other shut-off elements 57 are moved, by the pressure force acting on the respective second active surface 57*b*, into the shut-off position in which they block the flow path between the fluidic controller 1 and the respective area valve 111.

As is also shown in FIGS. 4 and 5, an alarm channel 63 for connecting the fluidic controller 1 in fluid-conducting fashion to the alarm means 113 is formed in each of the blocking modules and can be used when required.

As can be seen in particular in FIG. 5, the branch channels 61, 62 are manufactured as bores and are closed in fluid-tight fashion at the end by a closure piece 67. The receptacles for the shut-off element 57 and the non-return valve 59 are also formed by corresponding bores, which are closed in fluid-tight fashion by means of closure plugs 65. The manufacture of the area blocking apparatus 5 is thus made easier, and the production costs are reduced, for example in relation to a cast component. It is alternatively or additionally also possible for manual release elements to be fitted at the end of the flow channel.

The functioning of the fire extinguishing system 100 will be discussed below on the basis of an example.

In the event of a fire, one or more fire parameter detectors 101 transmit an electrical signal to the control system 103 (cf. FIG. 1), or a manual triggering device 102 is actuated. The received signals are analyzed by the control system 103 and compared with predefined threshold values, or the manual activation is assigned to an area. If it is apparent from the analysis that a fire is present, the control system 103 initiates the extinguishing operation for the affected area. For this purpose, said control system transmits an electrical signal to the control pressure source 105. The latter provides a defined control pressure that propagates in the system via the control lines. At the same time as the control pressure source, the control system 103 transmits electrical signals to the fluidic controller 1. These signals contain information regarding the area valves that are to be opened. In the case of the exemplary embodiment shown in FIG. 3, it is preferable here for the control valve module 7 to be actuated, which furthermore preferably performs all other actuating operations. It is preferable for the flow controller 9, the optional delay valve 52, the extinguishing agent release module and the area blocking apparatus to be actuated, if the shut-off element has not been moved into the shut-off position.

The fluidic controller 1 then provides the control pressure and transmits the control pressure to the area blocking apparatus 5. Said area blocking apparatus has, for each area valve 111, a blocking module 29 with a fluid inlet 19 and a fluid outlet 21 (cf. FIG. 5). The control pressure is applied only to those blocking modules 29, or to the fluid inlets 19 of those blocking modules 29, whose area valves 111 are to be opened. The blocking modules 29 are configured such that the control pressure is transmitted directly to the alarm means 113 belonging to the respective extinguishing area (cf. FIG. 2).

LIST OF REFERENCE NUMERALS AND DESIGNATIONS

1 Fluidic controller
3 Control unit
5 Area blocking apparatus
7 Control valve module
9 Flow control module
10 (Second) fluidic interface, controller
11 Main control element
12 (First) signal interface, controller
13 Control line
14 (Third) fluidic interface, controller
15 Shut-off element
16 (First) fluidic interface, blocking apparatus
17 Fluidic exit (first)
18 (Second) fluidic interface, blocking apparatus
19 Fluid inlet, blocking apparatus
21 Fluid outlet, blocking apparatus
25 Fluidic entrance (second)
27 Main element (area blocking apparatus)
29*a, b, c, d, e* Blocking module
31, 31*a, b, c, d, e* Fluid-conducting connections
33 Extinguishing agent release module
34 Release valve
35 Use/reserve switching module
11 Main control element
39 Flow path
41 Flow path
43 Control valve
45 Fluidic exit (second)
47 Shut-off element (of control valve)
49 Control valve non-return element
51 Flow path
52 Delay valve
53 Flow channels
55 Flow channels
57 Shut-off element
58 Restoring element
59 Non-return valve
61 Vertical branch channel
62 Horizontal branch channel
63 Alarm channel
65 Closure plug
67 Closure piece
100 Multi-area fire extinguishing system
101 Fire parameter detector
103 Control system
105 Control pressure source
107 Extinguishing agent vessel
109 Pipeline network
111 Area valve
113 Alarm means
102 Manual triggering device
m Number of fluid inlets
n Number of first fluidic exits

The invention claimed is:

1. A multi-area fire extinguishing system, comprising:

a control system, a number of fluid control lines and a plurality of control valves, each of the control valves having an associated shut-off element, that are configured to transmit a control pressure as a function of control commands of the control system, wherein each of the plurality of control valves and its associated shut-off element is associated with one fluid control line of the number of fluid control lines to allow and prevent fluidic transport of the control pressure through the respective fluid control line, a number of fluid-actuated area valves that are each in fluid communication with a respective fluid control line of the number of fluid control lines, wherein the area valves are configured to be actuated as a function of received control commands, and a fluid-actuated area blocking apparatus located between the associated shut-off element of each of the plurality of control valves and the number of fluid-actuated area valves, the fluid actuated area blocking apparatus having a plurality of flow paths, each flow path having an area blocking apparatus shut-off element, and each of the plurality of flows path flow paths being assigned to one of the number of fluid-actuated area valves and is operatively coupled to the one fluid control line of the number of fluid control lines, wherein the fluid-actuated area blocking apparatus flows the control pressure through the one fluid control line of the number of fluid control lines to each of the plurality of flow paths to open a fluid-actuated area valve of the number of the fluid-actuated area valves and to block opening of the other fluid-actuated area valves of the number of the fluid-actuated area valves.

2. The fire extinguishing system as claimed in claim 1, wherein the fluid control lines are operatively coupled to a fluidic controller that is in signal communication with the control system such as to receive control commands for combating a fire, wherein the controller is configured to actuate one or more of the area valves as a function of the received control commands, using the control pressure.

3. The fire extinguishing system as claimed in claim 2, wherein the fluidic controller further comprises:

a first interface for signal communication with the control system in order to receive, from the control system, control commands for combating a fire, and a second, fluidic, interface for fluid communication with the number of fluid control lines that transmit the control pressure, and a third, fluidic, interface for outputting the control pressure to actuate the number of fluid-actuated area valves, wherein the fluid controller is configured to, as a function of the control commands received from the control system via the first interface, transmit the control pressure to the third interface to actuate one or more of the area valves, and wherein the fluid controller has the fluid-actuated area blocking apparatus which is operatively coupled at one side to the third interface and at the other side to the area valves and which is configured such that, when one or more area valves are actuated by the third interface, said area blocking apparatus opens up those area valves and blocks all other area valves.

4. The fire extinguishing system as claimed in claim 2, wherein the fluid-actuated area blocking apparatus further comprises:

a first, fluidic, interface for fluid communication with the number of fluid control lines which each transmit the control pressure to actuate the number of fluid-actuated area valves, and a second, fluidic, interface for fluid communication with the area valves, wherein the plurality of flow paths of the area blocking apparatus extend from the first to the second interface to provide fluid communication between the control lines and the area valves.

5. The fire extinguishing system as claimed in claim 1, wherein the area blocking apparatus has a number of internal channels that fluidically connect the plurality of flow paths.

6. The fire extinguishing system as claimed in claim 5, wherein the area blocking apparatus has a number of fluid inlets and a number of fluid outlets in fluid communication with the fluid inlets, and wherein the fluid inlets are operatively coupled to the fluid controller and the fluid outlets are connected to a respective one of the area valves, wherein the area blocking apparatus is configured such that, whenever control pressure prevails at a fluid inlet, said area blocking apparatus transmits the control pressure from the respective fluid inlet to the fluid outlet and at the same time fluid-tightly separates all other fluid outlets from the fluid inlets.

7. The fire extinguishing system as claimed in claim 6, wherein the area blocking apparatus shut-off element in each of the plurality of flow paths can be moved into a shut-off position to block the flow path, and wherein the area blocking apparatus shut-off elements are operatively coupled such that those flow paths which are respectively assigned to an actuated area valve are opened up by the respective area blocking apparatus shut-off element, and at the same time all other area blocking apparatus shut-off elements assume the shut-off position to block the other flow paths.

8. The fire extinguishing system as claimed in claim 7, wherein the area blocking apparatus shut-off elements are actuated by differential pressure control and each have a first active surface and a second, spaced-apart active surface, wherein the area blocking apparatus shut-off elements move into the shut-off position when a greater pressure acts on the second active surface than on the first active surface.

9. The fire extinguishing system as claimed in claim 8, wherein control pressure acts on both the first active surface and the second active surface if control pressure to actuate the area valve prevails at the respective fluid inlet, wherein the second active surfaces are in fluid communication with one another such that control pressure simultaneously acts on all other second active surfaces, such that the flow path is opened up by the respective area blocking apparatus shut-off element which is assigned to the actuated area valve, and at the same time all other area blocking apparatus shut-off elements assume the shut-off position to block the other flow paths.

10. The fire extinguishing system as claimed in claim 9, wherein ambient pressure acts on both the first active surface and the second active surface if control pressure to actuate one of the area valves is absent from the respective fluid inlet.

11. The fire extinguishing system as claimed in claim 9, wherein the flow path upstream of the area blocking apparatus shut-off element has in each case one branch channel, and the second active surfaces are in fluid communication with the branch channels.

12. The fire extinguishing system as claimed in claim 11, wherein a non-return valve that is configured to prevent a flow from the branch channel in the direction of the fluid inlet is arranged in each of the branch channels.

13. The fire extinguishing system as claimed in claim 10, wherein the area blocking apparatus has a number of non-return elements that are each configured to subject the first active surface to a restoring force acting counter to the shut-off direction, such that the area blocking apparatus shut-off element must overcome the restoring force to move into the shut-off position.

14. The fire extinguishing system as claimed in claim 1, wherein the area blocking apparatus has multiple interconnectable blocking modules, and an area valve is assigned to each of the blocking modules, wherein each of the blocking modules has a fluid inlet, a fluid outlet and, arranged between fluid inlet and fluid outlet, the area blocking apparatus shut-off element for selectively blocking the flow path assigned to the respective area valve.

15. The fire extinguishing system as claimed in claim 14, wherein the fire extinguishing system furthermore has fluid-actuated alarm means, and the area blocking apparatus has, for each flow path, an alarm channel for fluid communication between the fluid controller and the alarm means.

16. The fire extinguishing system as claimed in claim 1, further comprising:

one or more fire parameter detectors that are arranged in a respective area of an object for monitoring, wherein the control system is in signal communication with the one or more fire parameter detectors, a number of extinguishing agent vessels, a pipeline network connected to the number of extinguishing agent vessels for transporting the extinguishing agent, wherein the pipeline network comprises the number of area valves, and a control pressure source including a pressurized gas vessel, which is connected to a fluidic controller.

17. A multi-area fire extinguishing system, comprising:

a control system, a number of fluid control lines and plurality of control valves, each of the plurality of control valves having an associated shut-off element, that are configured to transmit a control pressure as a function of control commands of the control system, wherein each of the plurality of control valves and its associated shut-off element is associated with one of the number of fluid control lines to allow and prevent fluidic transport of the control pressure through the one of the number of fluid control lines, a number of fluid-actuated area valves that are each in fluid communication with a respective fluid control line of the number of fluid control lines, wherein the area valves are configured to be actuated as a function of received control commands, and a fluid-actuated area blocking apparatus which is operatively coupled to each of the number of fluid control lines and to each of the number of fluid-actuated area valves via an assigned flow path of the fluid-actuated area blocking apparatus, each assigned flow path having an area blocking apparatus shut-off element in the form of a pressure controlled shut-off element located between one of the plurality of control valves and one of the number of fluid-actuated area valves, wherein the fluid-actuated area blocking apparatus transmits and blocks a flow of the control pressure through the assigned flow path, and wherein the fluid-actuated area blocking apparatus flows the control pressure from the one of the fluid control lines to each of the assigned flow paths to operate the pressure controlled shut-off element of the assigned flow path to actuate a fluid-actuated area valve of the number of fluid-actuated area valves and block actuation of the other fluid-actuated area valves of the number of fluid-actuated area valves.

* * * * *